US009751363B2

(12) United States Patent
Degrace et al.

(10) Patent No.: US 9,751,363 B2
(45) Date of Patent: Sep. 5, 2017

(54) SWIVEL CASTER

(71) Applicant: Dorel Juvenile Group, Inc., Foxboro, MA (US)

(72) Inventors: Michael Degrace, Lancaster, PA (US); Gregg Espenshade, Navron, PA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 87 days.

(21) Appl. No.: 14/835,897

(22) Filed: Aug. 26, 2015

(65) Prior Publication Data
US 2016/0059628 A1 Mar. 3, 2016

Related U.S. Application Data

(60) Provisional application No. 62/041,671, filed on Aug. 26, 2014.

(51) Int. Cl.
*B60B 33/02* (2006.01)
*B60B 33/00* (2006.01)

(52) U.S. Cl.
CPC ........ *B60B 33/028* (2013.01); *B60B 33/0068* (2013.01); *B60B 33/02* (2013.01); *B60B 33/025* (2013.01)

(58) Field of Classification Search
CPC ..... B60B 33/02; B60B 33/025; B60B 33/028; B60B 33/0068
USPC ................................................ 16/35 R, 35 D
See application file for complete search history.

(56) References Cited

U.S. PATENT DOCUMENTS

| | | | | | |
|---|---|---|---|---|---|
| 2,482,961 | A | * | 9/1949 | Bishop | B64C 25/505 16/35 D |
| 2,626,116 | A | * | 1/1953 | Steuby | B64C 25/50 16/35 D |
| 3,924,292 | A | * | 12/1975 | Christensen | B60B 33/02 16/35 D |
| 4,212,093 | A | * | 7/1980 | Lombard | A63C 17/0033 16/35 D |
| 4,246,677 | A | * | 1/1981 | Downing | B60B 33/02 16/35 R |
| 6,089,666 | A | | 7/2000 | Rosko | |
| 6,134,748 | A | * | 10/2000 | Kuo | B60B 33/06 16/34 |
| 6,419,249 | B1 | * | 7/2002 | Chen | A63C 17/0033 16/35 R |
| 6,671,926 | B2 | * | 1/2004 | Huang | B62B 7/04 16/18 R |
| 7,083,175 | B1 | * | 8/2006 | Liu | B60B 1/006 16/35 R |
| 7,770,905 | B2 | * | 8/2010 | Dotsey | B60B 33/0002 16/18 R |
| 9,603,764 | B2 | * | 3/2017 | Turturro | A61G 7/05 |
| 2015/0224823 | A1 | * | 8/2015 | Turturro | A61G 7/05 5/510 |

* cited by examiner

Primary Examiner — Jeffrey O Brien
(74) Attorney, Agent, or Firm — Barnes & Thornburg LLp

(57) ABSTRACT

A mobile cart such as a jogging stroller includes a frame and a swivel caster coupled to the frame. The swivel caster is arranged to swivel relative to the frame about a swivel axis.

14 Claims, 10 Drawing Sheets

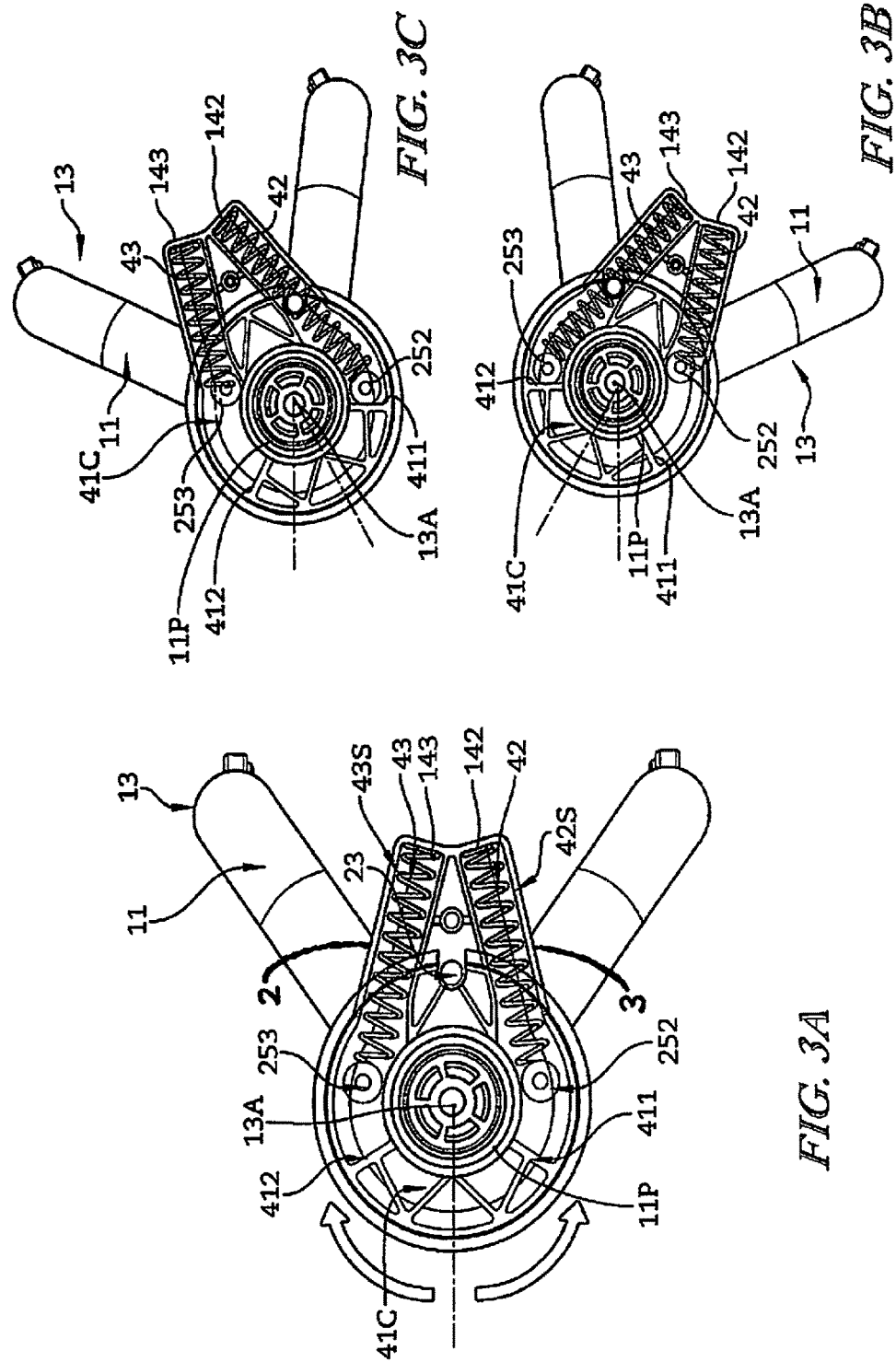

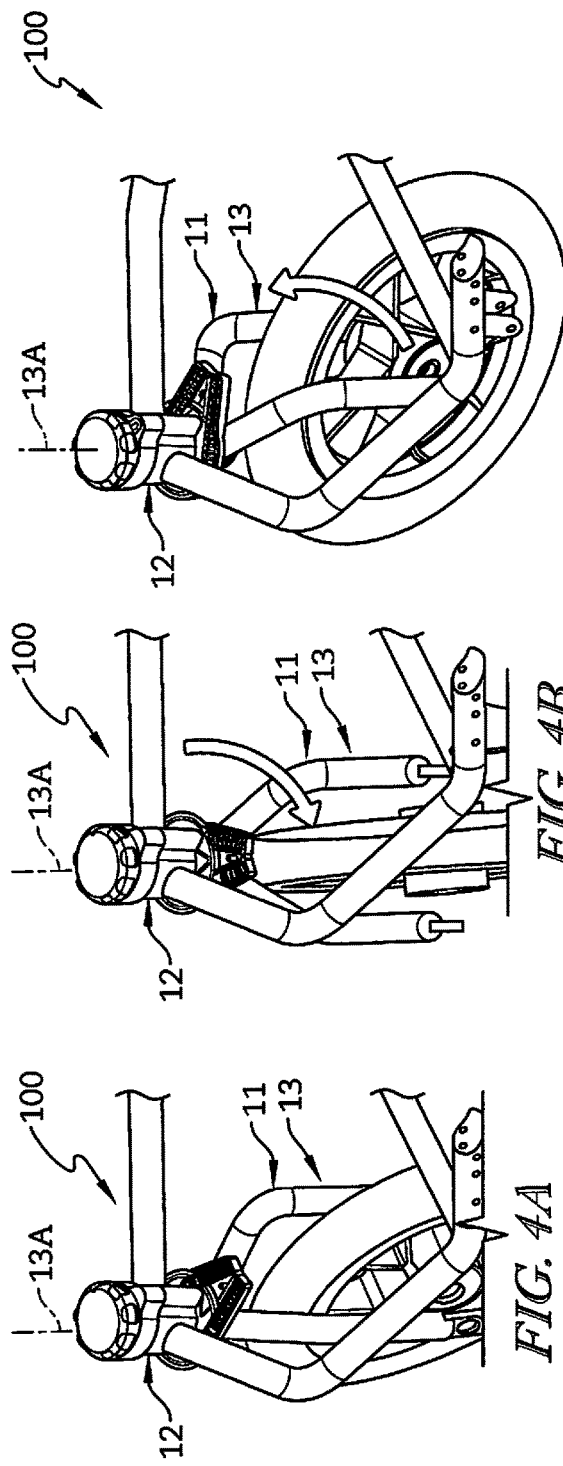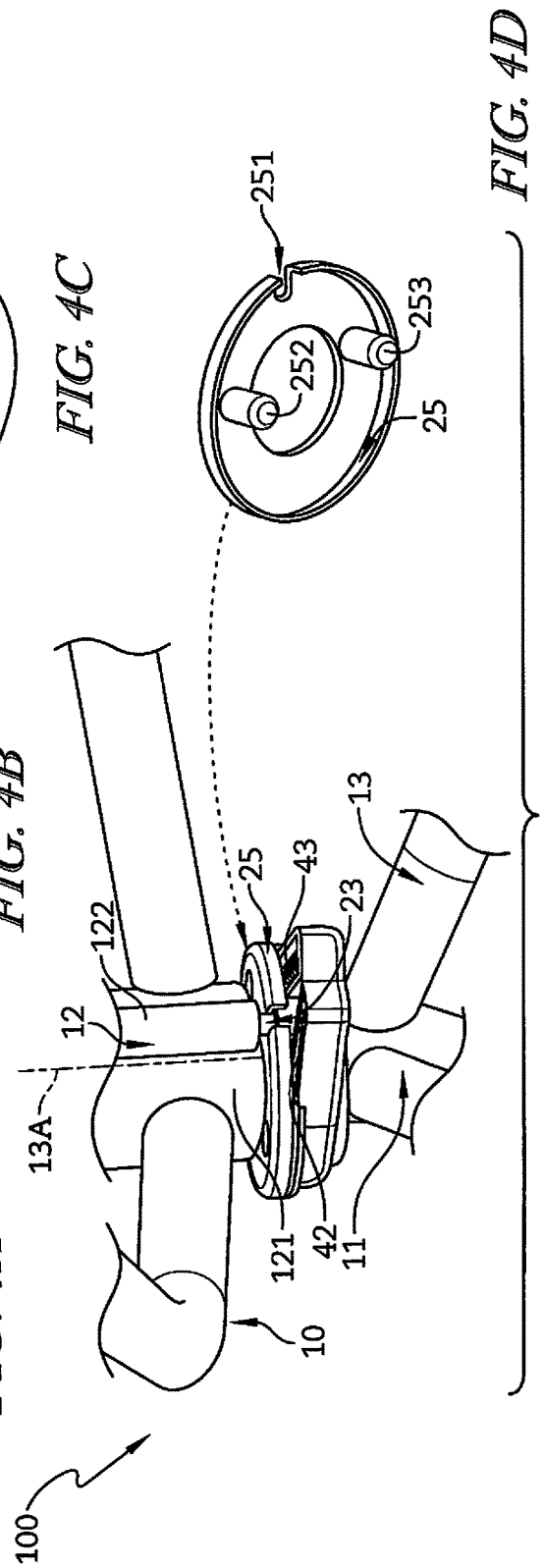

SWIVEL CASTER

PRIORITY CLAIM

This application claims priority under 35 U.S.C. §119(e) to U.S. Provisional Application Ser. No. 62/041,671, filed Aug. 26, 2014, which is expressly incorporated by reference herein.

BACKGROUND

The present disclosure relates to a swivel caster. It could be used on a jogging stroller with at least one swivel wheel or on other products like a shopping cart, wagon, two-wheel swivel jogging stroller, lumber cart, utility cart, or other mobile cart.

SUMMARY

A mobile cart in accordance with the present disclosure includes a rolling base and a swivel caster coupled to the rolling base. In illustrative embodiments, the mobile cart is a jogging stroller. The rolling base comprises a seat-support frame, a juvenile seat supported on a seat-support frame, and rear wheels coupled to a rear portion of the seat-support frame. The swivel caster is coupled to a front portion of the rolling base to provide a front wheel unit of the jogging stroller.

In illustrative embodiments, the seat-support frame of the mobile cart includes a caster-support hub and the swivel caster is mounted on the caster-support hub for swiveling movement relative to the caster-support hub about a vertical rotation axis. In accordance with the present disclosure, in a free-swiveling mode, the swivel caster is free to swivel about the vertical rotation axis relative to the caster-support hub. For example, the swivel caster can swivel from a centered position in a clockwise direction to a right-swivel position. The swivel caster can also swivel from the centered position in a counterclockwise direction to a left-swivel position.

In illustrative embodiments, the mobile cart further includes a caster controller that is coupled to the center-support hub and configured to rotate the swivel caster automatically to the centered position should the swivel caster rotate about the vertical rotation axis temporarily to either the right-swivel position or the left-swivel position. The caster controller is configured to apply a yieldable clockwise torque to the swivel caster to urge the swivel caster to rotate about the vertical rotation axis in a clockwise direction from the left-swivel position to the centered position. The caster controller is also configured to apply a yieldable counterclockwise torque to the swivel caster to urge the swivel caster to rotate about the vertical rotation axis in a counterclockwise direction from the right-swivel position to the centered position.

In illustrative embodiments, the mobile cart further includes caster-lock means for selectively retaining the swivel caster in the centered position. The caster-lock means, for example, includes a spring-biased lockout pin arranged to move up and down along a pin-motion axis that is arranged to lie in a spaced-apart parallel rotation to the vertical rotation axis and a cam-actuated pin lifter for moving the lockout pin upwardly away from ground underlying the mobile cart to disengage the caster controller to free the swivel caster to rotate about the vertical rotation axis to either the right-swivel position or the left-swivel position or to another non-centered position.

In illustrative embodiments, the mobile cart further includes a left-side centering spring configured and arranged to generate the yieldable clockwise torque to urge the swivel caster from the left-swivel position to the centered position and a right-side centering spring configured and arranged to generate the yieldable counterclockwise torque to urge the swivel caster from the right-swivel position to the centered position. In a first embodiment, the centering springs are coiled compression springs that are arranged to lie in generally side-by-side diverging relation to one another. In a second embodiment, the centering springs are coiled compression springs that are arranged to lie in generally end-to-end relation to one another. In a third embodiment, a single coiled compression spring is used and mated (in the middle) with a spring-stop plate that is coupled to the swivel caster to rotate therewith to, in effect, partition the single coiled compression spring to produce a right-side centering spring and a left-side centering spring without breaking the single coiled compression spring into two entirely separate springs separated by the spring-stop plate. Means is provided in accordance with the present disclosure for selectively adjusting the compression of each of the centering springs in illustrative embodiments.

In illustrative embodiments, the mobile cart further includes tracking-adjustment means for changing the centered position of the swivel caster relative to the seat-support frame from one angular position to another angular position. The tracking-adjustor means can be used by an operator to change the tracking direction associated with the centered position of the swivel caster by changing the orientation of an original centered position to a different centered position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 3A is a sectional view showing a swivel caster of the swivel wheel unit of FIG. 2B in a centered position;

FIG. 3B is a view similar to FIG. 3A showing the swivel caster in a right-swivel position;

FIG. 3C is a view similar to FIG. 3A showing the swivel caster in a left-swivel position;

FIG. 4A is a partial prospective view of the frame of the mobile cart showing the swivel caster in the centered position of FIG. 3A;

FIG. 4B is a partial perspective view similar to FIG. 4A showing the swivel caster in the right-swivel position;

FIG. 4C is a partial perspective view similar to FIGS. 4A and 4B showing the swivel caster in the left-swivel position;

FIG. 4D is a partial perspective view of the frame of the mobile cart showing the swivel caster in the centered position;

DETAILED DESCRIPTION

A caster controller in accordance with the present disclosure is suitable for use in jogging stroller designs that are equipped with a front swiveling caster wheel to improve ease of steering when in a jogging mode. Users are often instructed to lock the front wheel from swivel rotation either in a trailing or leading fork position. When the swivel wheel is locked it affects the ability for the user to steer the stroller without lifting the front wheel off the ground. In some instances, front swivel wheel jogging strollers may develop a wheel shimmy if the user tries to jog with the front wheel in the swiveling (unlocked) position. The caster controller disclosed herein operates to control the swiveling motion of a swivel caster included in a jogging stroller or other mobile cart to eliminate shimmy while affording the user steering ability while jogging or strolling at a faster pace.

Mechanical means is provided in accordance with the present disclosure to control steering and eliminate shimmy associated with the operation of a swivel caster while a stroller including the swivel caster is in swivel mode and is at jogging speeds. Incorporated into the fork of the swivel caster there is a feature which allows connection between the fork and the frame of the stroller. The connection is made through a swivel-lock control knob when it is rotated 90 degrees it releases the spring-loaded swivel lock pin that locks when the swivel caster is rotated to the open hole in the swivel lockout plate. This connection provides a limited range of swivel rotation but enough to allow the stroller to maneuver. The swivel rotation range is force-biased equally on both sides so that the swivel caster is centered and parallel to the longitudinal axis of the stroller when in the jogging mode.

Figure 1:
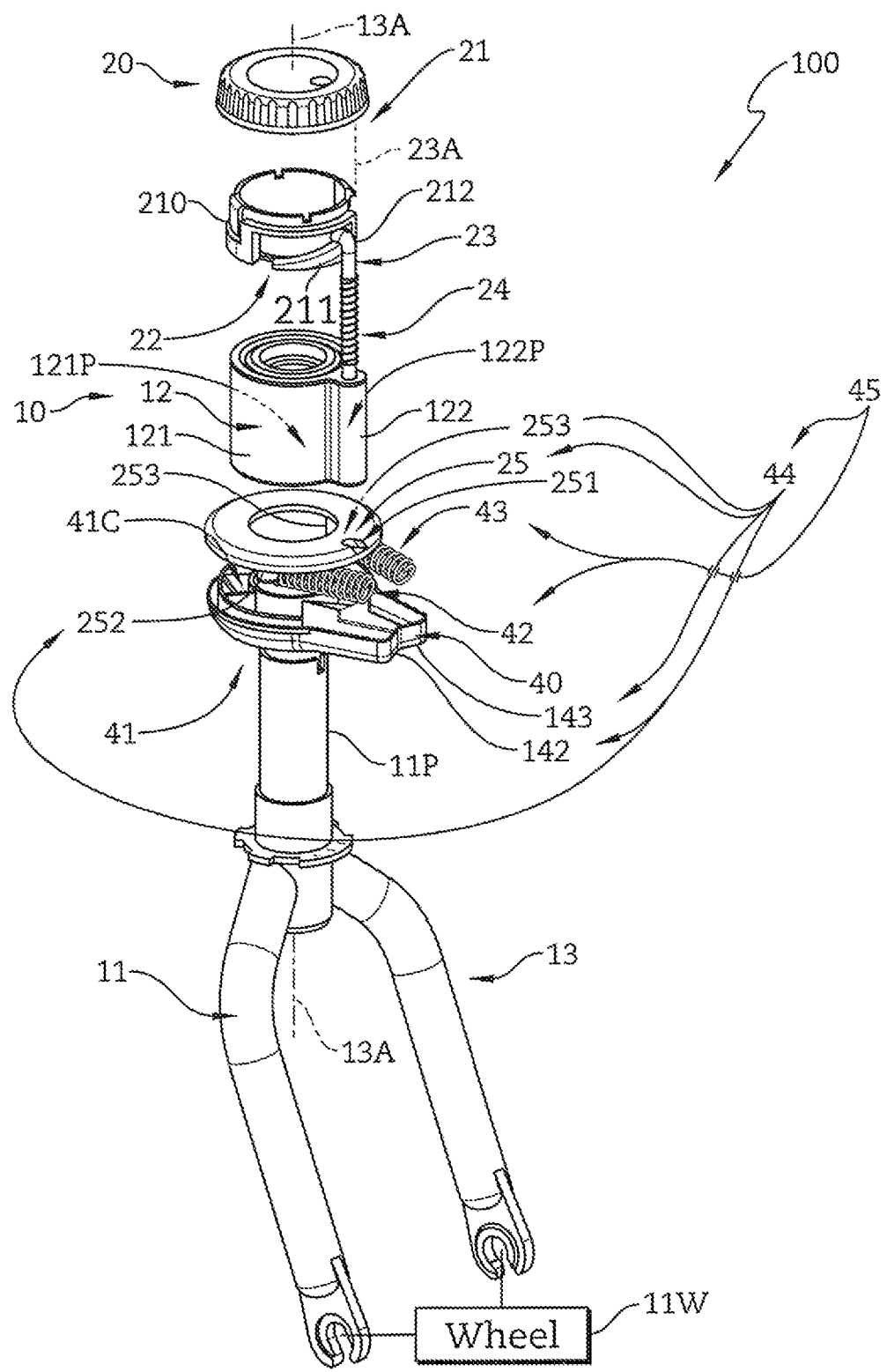
FIG. 1 is an exploded perspective assembly view of a swivel wheel unit in accordance with a first embodiment of the present disclosure that is associated with a hub included in a frame of a mobile cart and showing that the swivel wheel unit includes a swivel caster including a fork and a wheel coupled to the fork, a caster controller including two side-by-side springs for applying centering torques to the swivel caster, and a caster lock including a vertical spring-biased lockout pin.

An exploded view of the connection provided in a first embodiment of the present disclosure between a stroller frame 10 and the fork 11 which is rotationally connected to the stroller frame 10 and has a wheel 11W arranged thereon is shown, for example, in FIG. 1. The connection includes a swivel lock assembly 20 that is configured to provide a caster lock and a self-centering assembly 40 that is configured to provide a caster controller.

The swivel lock assembly 20 is operably connected to a caster-support hub 12 of the stroller frame 10 and includes a swivel-lock control knob 21 having a lockout pin cam 22, a lockout pin 23 driven by the lockout pin cam 22 while the swivel-lock control knob 21 is operated and a lockout pin spring 24 for biasing the lockout pin 23. The swivel lock assembly 20 further has a swivel lockout plate 25 rotationally mounted on the fork 11 and having a lockout hole 251 for the lockout pin 23 engaging therein and two posts 252, 253 for interacting with the self-centering assembly 40.

The self-centering assembly 40 includes two symmetrical and pre-loaded equally sized/rated centering springs 42, 43 and a spring housing cup 41 fixed on the fork 11. The spring housing cup 41 houses the symmetrical centering springs 42, 43 and has two rotational stops 411, 412 for stopping the spring housing cup 41 rotating relative to the posts 252, 253. One end of each centering spring 42, 43 is connected to each post 252, 253 of the lockout plate 25, and the other end of each centering spring 42, 43 is against a wall 142 or 143 of the spring housing cup 41. Each spring 42, 43 is a coiled compression spring in an illustrative embodiment.

Figure 2A:
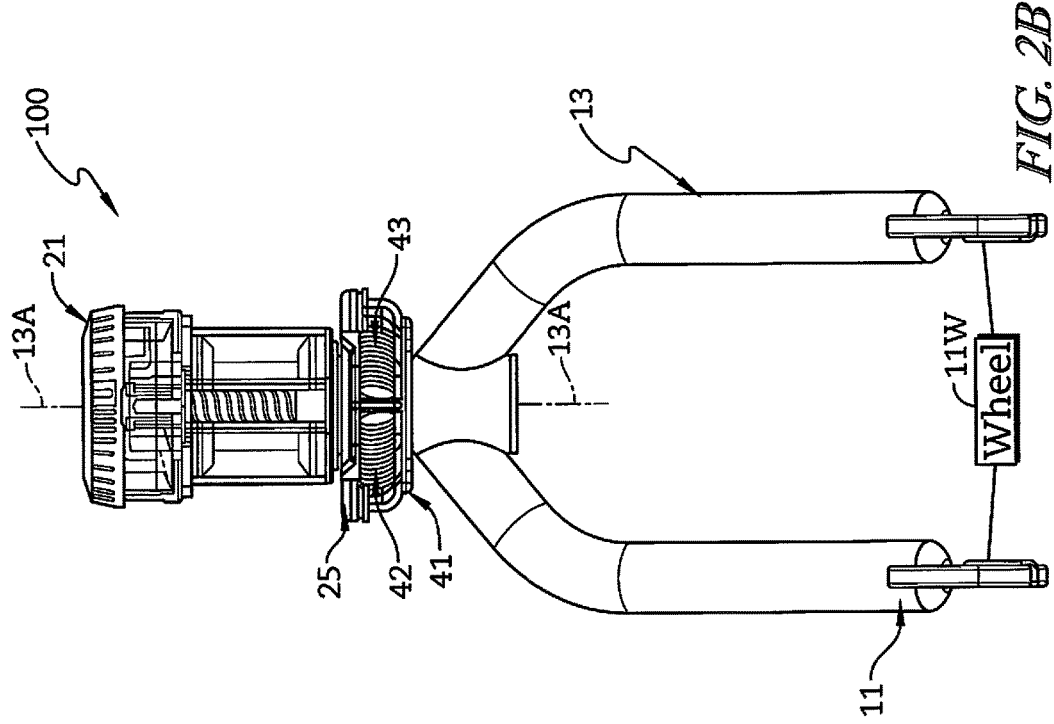
FIG. 2A is a side elevation view of the swivel wheel unit of FIG. 1 after the components in the swivel wheel unit have been assembled and mounted on the hub.
Figure 2B:
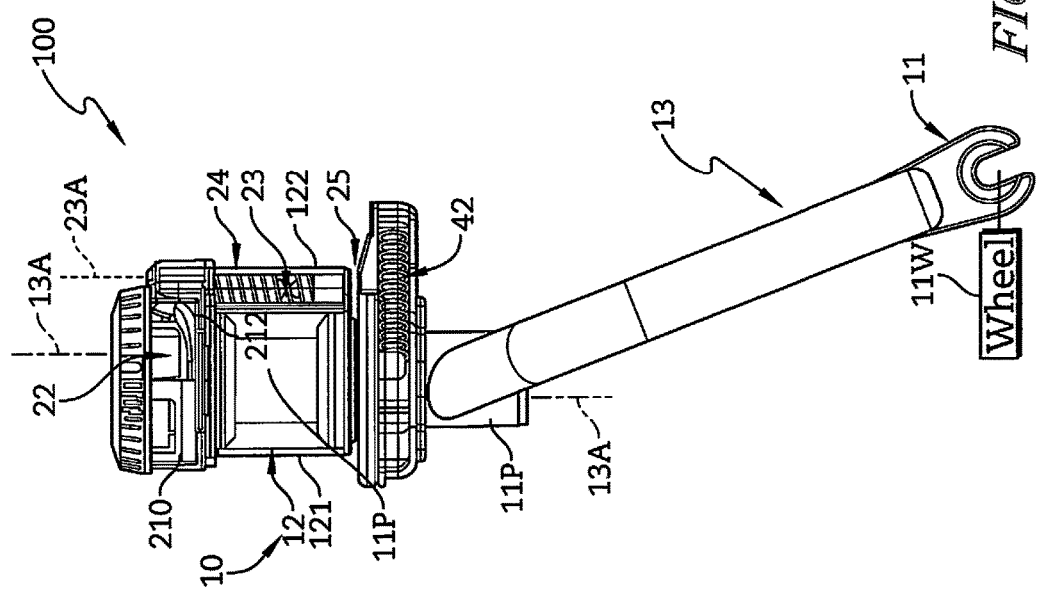
FIG. 2B is a front elevation view of the swivel wheel unit of FIG. 2A.

FIGS. 2A and 2B show a swivel mode/position of the first embodiment. The swivel wheel 11W and its fork 11 are able to rotate 360 degrees respective to the caster-support hub 12 of the stroller frame 10 when the lockout pin 23 disengages from the lockout hole 251.

FIG. 3 and FIG. 4 are in the jogging/running mode. The swivel wheel 11W and its fork 11 could swivel at a limited rotatable range (FIG. 3B-3C, FIG. 4B-4D) and swivel to a central line automatically (FIG. 3A, FIG. 4A) when the lockout pin 23 engages the lockout hole 251 in the lockout plate 25 during jogging/running mode.

In the FIG. 3B-3C and FIG. 4B-4D, the fork 11 with the spring housing cup 41 swivels to the left or right side at β° rotation (ex. 30 degrees) as the arrows shown in FIG. 3A when a swivel caster 13 including fork 11 and wheel 11W suffers an external force or an obstacle on a ground. One of the centering springs 42, 43 is compressed and the other of the centering springs 42, 43 is un-compressed when the spring housing cup 41 rotates relative to the posts 252, 253 of the lockout plate 25 during the jogging/running mode. The maxima swivel rotation to the right and the left is subjected to rotational stops 411, 412. The fork 11 will stop to rotate when one of the spring posts 252, 253 contacts one of the rotational stops 411, 412 as suggested, for example, in FIGS. 3B and 3C. The fork 11 with the spring housing cup 41 will swivel back to or close to the central line automatically via the resilience of centering springs 42, 43 when the external force or the obstacle on a ground disappears or reduces, as suggested in FIG. 3A, and FIG. 4A.

A mobile cart 100 in accordance with a first embodiment of the present disclosure comprises a swivel caster 13 and a frame 10 including a caster-support hub 12 as suggested in FIG. 1. Swivel caster 13 is mounted on caster-support hub 12 for swiveling movement relative to caster-support hub 12 about a vertical rotation axis 13A from a centered position shown in FIGS. 3A and 4A in a counterclockwise direction to a left-swivel position shown in FIGS. 3C and 4C or from the centered position in a clockwise direction to a right-swivel position shown in FIGS. 3B and 4B.

Mobile cart 100 also includes caster-controller means 45 coupled to caster-support hub 12 as suggested in FIG. 1 for applying a yieldable clockwise torque to the swivel caster 13 to urge the swivel caster 13 to rotate about the vertical rotation axis 13A in a clockwise direction to the centered position from the left-swivel position as suggested in FIGS. 3C and 4C, and, alternatively, a yieldable counterclockwise torque to the swivel caster 13 to urge the swivel caster 13 to rotate in a counterclockwise direction to the centered position from the right-swivel position as suggested in FIGS. 3B and 4B during movement of the mobile cart 100 so that the swivel caster 13 is maintained generally in the centered position while the mobile cart 100 is in motion as suggested in FIGS. 3A and 4A.

The caster-controller means 45 includes a right-side centering spring 42, a left-side centering spring 43, and a swivel-rotation limiter 44 including a first spring seat 142, a second spring seat 143, a lockout plate 25, a first spring post 252, and a second spring post 253 as suggested in FIG. 1. First spring seat 142 is coupled to swivel caster 13 to rotate therewith about the vertical rotation axis 13A and associated with right-side centering spring 42. Second spring seat 143 is coupled to swivel caster 13 to rotate therewith about the vertical rotation axis 13A and associated with left-side centering spring 43. Lockout plate 25 is mounted on swivel caster 13 for rotation about the vertical rotation axis 13A relative to the spring seats 142, 143. First spring post 252 is coupled to lockout plate 25 to rotate therewith and second spring post 253 also is coupled to the lockout plate 25 to rotate therewith as suggested in FIG. 4D. Right-side centering spring 42 is arranged to lie in a first spring-receiver space 42S as suggested in FIG. 3A to act against first spring post 252 and first spring seat 142 to store potential energy in response to rotation of swivel caster 13 about the vertical rotation axis 13A in the counterclockwise direction from the centered position to the right-swivel position. Left-side centering spring 43 is arranged to lie in a second spring-receiver space 43S as suggested in FIG. 3A to act against second spring post 253 and second spring seat 143 to store potential energy in response to rotation of swivel caster 13 about the vertical rotation axis 13A in the clockwise direction from the centered position to the left-swivel position.

The swivel-rotation limiter 44 also includes a first rotational stop 411 and a second rotational stop 412 as shown, for example, in FIGS. 3A-3C. First rotational stop 411 is arranged to lie in spaced-apart relation to right-side centering spring 42 to locate the movable first spring post 252 therebetween. As suggested in FIGS. 3A and 3C, rotation of swivel caster 13 about vertical rotation axis 13A is stopped when first spring post 252 engages first rotational stop 411 upon arrival of swivel caster 13 at the left-swivel position shown in FIG. 3C. Second rotational stop 412 is arranged to lie in spaced-apart relation to left-side centering spring 43 to locate the movable second spring post 253 therebetween. As suggested in FIGS. 3A and 3B, rotation of swivel caster 13 about vertical rotation axis 13A engages second rotational stop 412 upon arrival of swivel caster 13 at the right-swivel position shown in FIG. 3B.

In illustrative embodiments, spring housing cup 41 is formed to include each of first and second spring seats 142, 143 and each of rotational stops 411, 412 as shown in FIG. 3A. One end of right-side centering spring 42 is arranged to engage first spring seat 142 and an opposite end of right-side centering spring 42 is arranged to engage the movable first spring post 252. First rotational stop 411 is arranged to lie in a fixed spaced-apart relation to first spring seat 142 to locate first spring post 252 and right-side centering spring 42 therebetween as shown, for example, in FIG. 3B. One end of left-side centering spring 43 is arranged to engage second spring seat 143 and an opposite end of left-centering spring 43 is arranged to engage the movable second spring post 253. Second rotational stop 412 is arranged to lie in a fixed spaced-apart relation to second spring seat 143 to locate second spring post 253 and left-side centering spring 43 therebetween as shown, for example, in FIG. 3C.

Mobile cart 100 also includes caster-lock means for retaining swivel caster 13 in the centered position to block rotation of swivel caster 13 about vertical rotation axis 13A to either the right-swivel position or the left-swivel position. The caster-lock means is coupled to caster-support hub 12 and configured to move relative to caster-support hub 12 at the option of a caregiver either to engage lockout plate 25 of swivel-rotation limiter 44 to retain swivel caster 13 in the centered position or to disengage lockout plate 25 of swivel-rotation limiter 44 to free swivel caster 13 to rotate about the vertical rotation axis 13A.

In illustrative embodiments, the caster-lock means includes a lockout pin 23 and a pin-biasing spring 24 as suggested in FIG. 1. Lockout pin 23 is supported for up-and-down movement along a vertical pin-motion axis 23A that is arranged to lie in spaced-apart parallel relation to the vertical rotation axis 13A as suggested in FIGS. 1 and 2A. Pin-biasing spring 24 is arranged normally to urge a tip of the lockout pin 23 into a pin-receiving aperture 251 formed in lockout plate 25 of the swivel-rotation limiter 44 upon rotation of swivel caster 13 to the centered position to retain swivel caster 13 in the centered position.

The caster-lock means further includes pin-mover means for withdrawing the tip of lockout pin 23 from the pin-receiving aperture 251 to overcome a biasing force generated by pin-biasing spring 24 to free swivel caster 13 to rotate about the vertical rotation axis 13A. The pin-mover means includes a swivel-lock control knob 21 including a base 210 mounted to rotate about the vertical rotation axis 13A, a cam 211 coupled to base 210 to rotate therewith about the vertical rotation axis 13A, and a cam follower 212 as suggested in FIG. 1. Cam follower 212 is coupled to lockout pin 23 and arranged to engage cam 211 and move lockout pin 23 to disengage the pin-receiving aperture 251 formed in lockout plate 25 in response to rotation of base 210 of swivel-lock control knob 21 about the vertical rotation axis 13A relative to caster-support hub 12.

Caster-support hub 12 includes a first sleeve 121 formed to include a post-receiver passageway 121P and a second sleeve 122 coupled to the first sleeve 121 and formed to include a pin-receiver passageway 122P as suggested in FIG. 1. Swivel caster 13 includes a fork 11 having an upright post 11P arranged to extend into the post-receiver passageway 121P and supported in rotative bearing engagement therein to rotate about the vertical rotation axis 13A among the right-swivel, centered, and left-swivel positions as suggested in FIGS. 1 and 3A-3C. Lockout pin 23 is arranged to extend into the pin-receiver passageway 122P and move up and down therein to engage and disengage lockout plate 25 as suggested in FIGS. 1, 2A, 2B, and 4D.

Mobile cart 100 further includes means for selectively changing the compression of each of the right-side and left-side centering springs 42, 43. Means is also included in the mobile cart 100 for selectively changing the orientation of the centered position relative to the seat-support frame 10 to a different centered position relative to the vertical rotation axis 13A to cause the swivel caster 13 to track at an angle associated with the different centered position.

First and second spring seats 142, 143 are included in a spring housing cup 41 that is coupled to the swivel caster 13 to rotate therewith in a first embodiment of the present disclosure as suggested in FIGS. 3A and 3B. Spring housing cup 41 is formed to include a post-receiver chamber 41C sized to receive the first and second swing posts 252, 253 therein, a first spring shell 2, and a second spring shell 3. First spring shell 2 is configured to define a boundary of the first spring-receiver space 42S and extend from the first spring seat 142 to the first spring post 252. Second spring shell 3 that is configured to define a boundary of the second spring-receiver space 43S and extend from the second spring seat 143 to the second spring post 253. First and second spring posts 252. 253 are arranged to extend into the post-receiver chamber 41C formed in spring housing cup 41 to engage the right-side and left-side centering springs 42, 43 and to move in the post-receiver chamber 41C about the vertical rotation axis 13A relative to the spring housing cup 41 during rotation of swivel caster 13 from the centered position either to the left-swivel position or to the right-swivel position. Right-side and left-side centering springs 42, 43 are arranged to lie in generally spaced-apart side-by-side relation to one another as suggested in FIGS. 3A-3C. Spring housing cup 41 also includes first and second rotational stops 411, 412 as shown, for example, in FIG. 3A.

Figure 5:
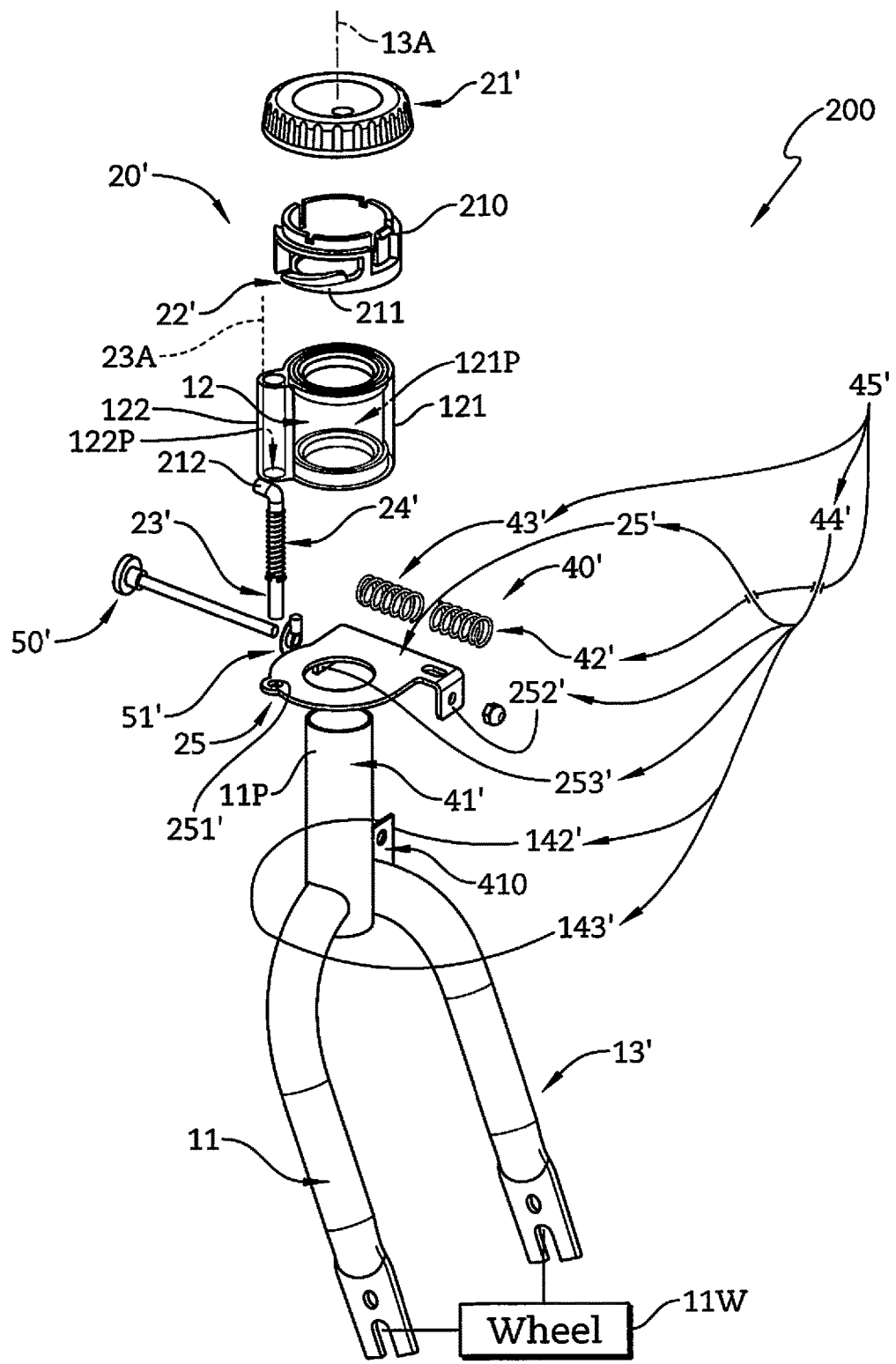
FIG. 5 is an exploded perspective assembly view of a swivel wheel unit in accordance with a second embodiment of the present disclosure that is associated with a hub included in a frame of a mobile cart and showing that the swivel wheel unit includes a swivel caster including a fork and a wheel coupled to the fork, a caster controller including two end-to-end springs for applying centering torques to the swivel caster, and a caster lock including a vertical spring-biased lockout pin.

An exploded view of the connection provided in a second embodiment of the present disclosure between the stroller frame 10 and the fork 11 which is rotationally connected to the stroller frame 10 and has a wheel unit 11W arranged thereon is shown, for example, in FIG. 5. The connection includes a swivel lock assembly 20' that is configured to provide a caster lock and a self-centering assembly 40' that is configured to provide a caster controller.

The swivel lock assembly 20' is operably connected to the caster-support swivel hub 12 of the stroller frame 10 and includes a swivel-lock control knob 21' having a lockout pin cam 22', a lockout pin 23' driven by the lockout pin cam 22' while the swivel-lock control knob 21' is operated, and a lockout pin spring 24' for biasing the lockout pin 23'. The swivel lock assembly 20' further has a swivel lockout plate 25' rotationally mounted on the fork 11 and having a lockout hole 251' for the lockout pin 23' engaging therein.

The self-centering assembly 40' includes two symmetrical and pre-loaded equally sized/rated centering springs 42', 43' and a spring housing cup 41' fixed on the fork 11. The spring housing cup 41' has a tab 410 fixed thereon and/or on the fork 11. Outer end of each centering spring 42', 43' is against a vertical wall of the lockout plate 25', and the inner end of each centering spring 42', 43' is against the tab 410 of the spring housing cup 41'. The second embodiment also could switch to swivel mode/position. The swivel wheel 11W and its fork 11 are able to rotate 360 degrees respective to the caster-support hub 12' of the stroller frame 10 when the lockout pin 23' disengages from the lockout hole 251'.

Figure 6B:
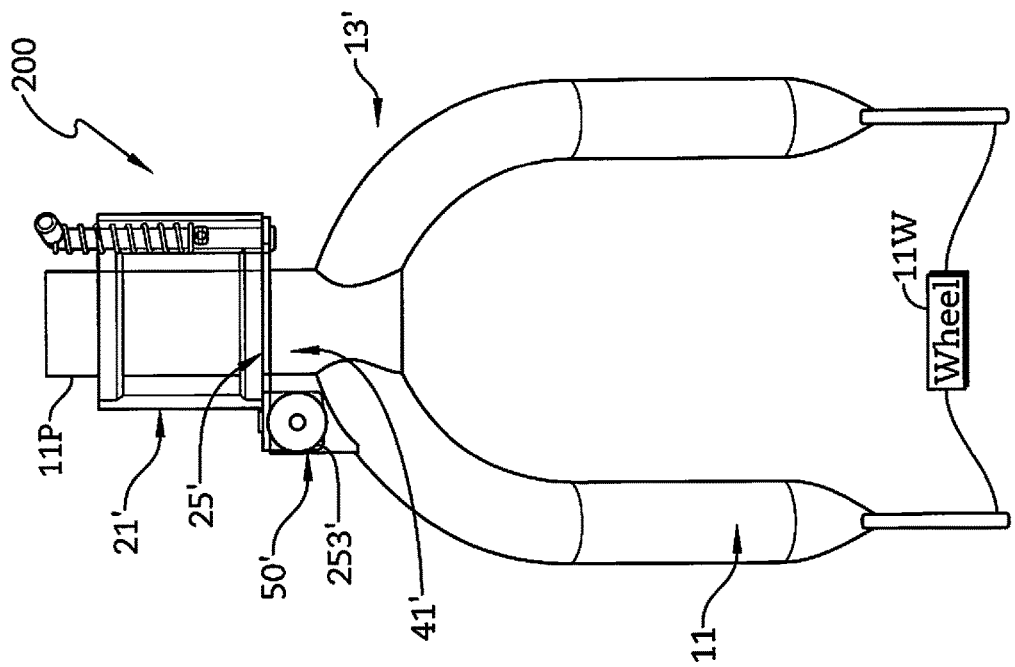
FIG. 6B is a front elevation view of the swivel wheel unit of FIG. 6A.
Figure 6A:
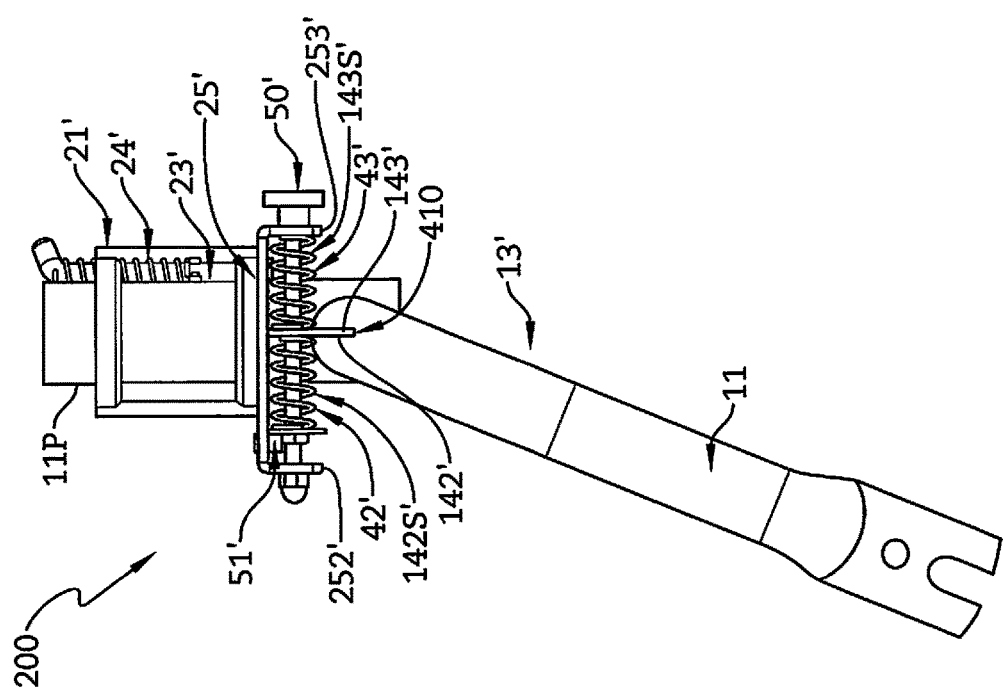
FIG. 6A is a side elevation view of the swivel wheel unit of FIG. 5 after the components in the swivel wheel unit have been assembled and mounted on the hub.
Figure 7B:
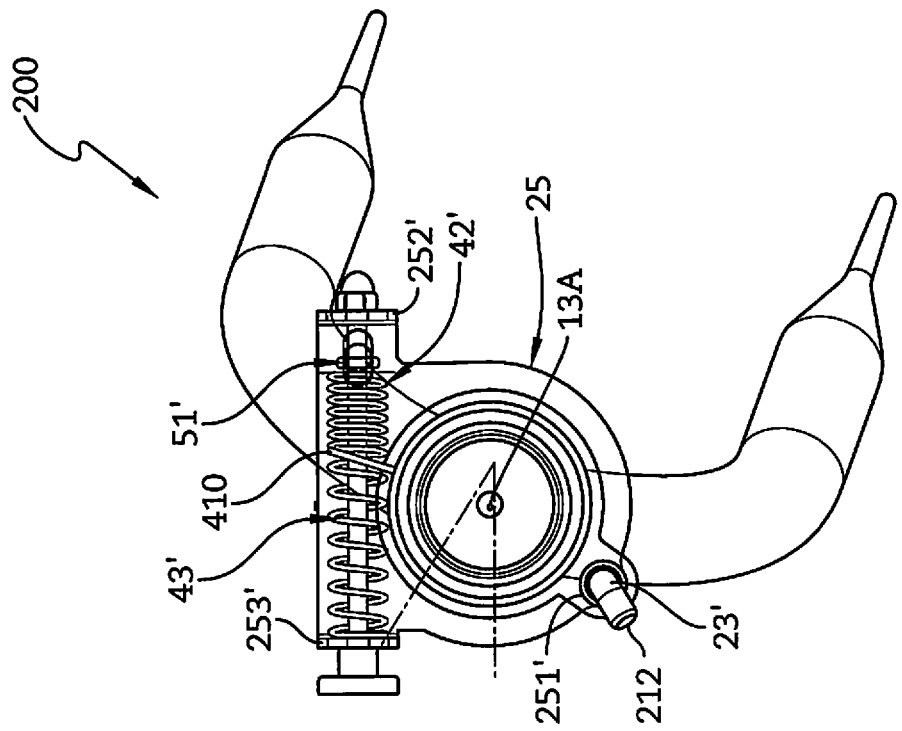
FIG. 7B is a view similar to FIG. 7A showing the swivel caster in a right-swivel position.
Figure 7A:
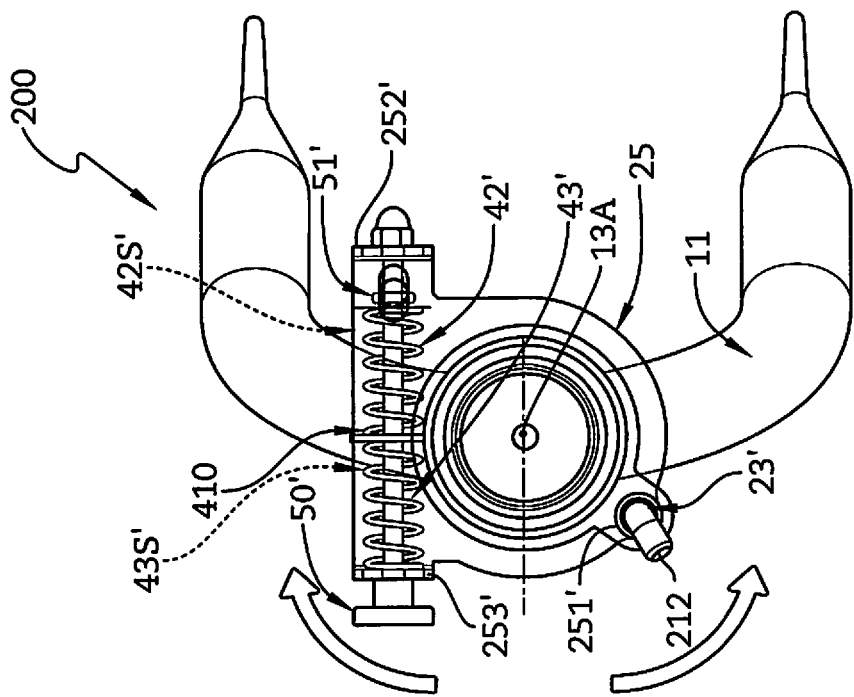
FIG. 7A is a sectional view showing a swivel caster of the swivel wheel unit of FIG. 6B in a centered position.

FIG. 6 and FIG. 7 are in the jogging/running mode. The swivel wheel 11W and its fork 11 could swivel at a limited rotatable range (FIG. 7B) and swivel to a central line automatically (FIG. 6A-6B, FIG. 7A) when the lockout pin 23' engages the lockout hole 251' in the lockout plate 25' during jogging/running mode.

In the FIG. 7B, the fork 11 with the spring housing cup 41' swivels to the left or right side at β° rotation (ex. 30 degrees) as the arrows shown in FIG. 7A when the swivel wheel 11W suffers an external force or an obstacle on a ground. One of the centering springs 42', 43' is compressed and the other of the centering springs 42', 43' is un-compressed when the spring housing cup 41' with the tab 410 rotates relative to the lockout plate 25' during the jogging/running mode. The fork 11 with the spring housing cup 41' will swivel back to or close to the central line automatically via the resilience of centering springs 42', 43' when the external force or the obstacle on a ground disappears or reduces, as FIG. 6A-6B, FIG. 7A.

A mobile cart 200 in accordance with a second embodiment of the present disclosure comprises a swivel caster 13' and a frame 10 including a caster-support hub 12 as suggested in FIG. 5. Swivel caster 13' is mounted on caster-support hub 12 for swiveling movement relative to caster-support hub 12 about a vertical rotation axis 13A from a centered position shown in FIG. 7A in a counterclockwise direction to a left-swivel position (not shown but similar to FIG. 3C) shown in or from the centered position in a clockwise direction to a right-swivel position shown in FIG. 7B. Mobile cart 200 also includes caster-controller means 45' coupled to caster-support hub 12 for applying a yieldable clockwise torque to the swivel caster 13' to urge the swivel caster 13' to rotate about the vertical rotation axis 13A in a clockwise direction to the centered position from the left-swivel position, and, alternatively, a yieldable counterclockwise torque to the swivel caster 13' to urge the swivel caster 13' to rotate in a counterclockwise direction to the centered position from the right-swivel position as suggested in FIG. 7B during movement of the mobile cart 200 so that the swivel caster 13' is maintained generally in the centered position while the mobile cart 200 is in motion.

The caster-controller means 45' includes a right-side centering spring 42', a left-side centering spring 43', and a swivel-rotation limiter 44' including a first spring seat 142', a second spring seat 143', a lockout plate 25', a first spring post 252', and a second spring post 25'. First spring seat 142' is coupled to swivel caster 13' to rotate therewith about the vertical rotation axis 13A and associated with right-side centering spring 42'. Second spring seat 143' is coupled to swivel caster 13' to rotate therewith about the vertical rotation axis 13A and associated with left-side centering spring 43'. Lockout plate 25' is mounted on swivel caster 13' for rotation about the vertical rotation axis 13A relative to the spring seats 142', 143'. First spring post 252' is coupled to lockout plate 25' to rotate therewith and second spring post 253' is coupled to the lockout plate 25' to rotate therewith. Right-side centering spring 42' is arranged to lie in a first spring-receiver space 42S' provided between first spring seat 142' and first spring post 252' as suggested in FIG. 7A to act against first spring post 252' and first spring seat 142' to store potential energy in response to rotation of swivel caster 13' about the vertical rotation axis 13A in the counterclockwise direction from the centered position to the right-swivel position. Left-side centering spring 43' is arranged to lie in a second spring-receiver space 43S' as suggested in FIG. 7A to act against second spring post 253' and second spring seat 143' to store potential energy in response to rotation of swivel caster 13' about the vertical rotation axis 13A in the clockwise direction from the centered position to the left-swivel position.

Mobile cart 200 also includes caster-lock means for retaining swivel caster 13' in the centered position to block rotation of swivel caster 13' to either the right-swivel position or the left-swivel position. The caster-lock means is coupled to caster-support hub 12 and configured to move relative to caster-support hub 12 at the option of a caregiver either to engage lockout plate 25' of swivel-rotation limiter to retain swivel caster 13' in the centered position or to disengage lockout plate 25' of swivel-rotation limiter 44' to free swivel caster 13' to rotate about the vertical rotation axis 13A.

In illustrative embodiments, the caster-lock means includes a lockout pin 23' and a pin-biasing spring 24' as suggested in FIG. 5. Lockout pin 23' is supported for up-and-down movement along a vertical pin-motion axis 23A that is arranged to lie in spaced-apart parallel relation to the vertical rotation axis 13A. Pin-biasing spring 24 is arranged normally to urge a tip of the lockout pin 23 into a pin-receiving aperture 251' formed in lockout plate 25' of the swivel-rotation limiter upon rotation of swivel caster 13' to the centered position to retain swivel caster 13' in the centered position.

The caster-lock means further includes pin-mover means for withdrawing the tip of lockout pin 23' from the pin-receiving aperture 251' to overcome a biasing force generated by pin-biasing spring 24' to free swivel caster 13' to rotate about the vertical rotation axis 13A. The pin-mover means includes a swivel-lock control knob 21' including a base 210 mounted to rotate about the vertical rotation axis 13A, a cam 211 coupled to base 210 to rotate therewith about the vertical rotation axis 13A, and a cam follower 212 as suggested in FIG. 5. Cam follower 212 is coupled to lockout pin 23' and arranged to engage cam 211 and move lockout pin 23' to disengage the pin-receiving aperture 251' formed in lockout plate 25' in response to rotation of base 210 of swivel-lock control knob 21' about the vertical rotation axis 13A relative to caster-support hub 12.

Caster-support hub 12 includes a first sleeve 121 formed to include a post-receiver passageway 121P and a second sleeve 122 coupled to the first sleeve 121 and formed to include a pin-receiver passageway 122P as suggested in FIG. 5. Swivel caster 13' includes a fork 11 having an upright post 11P arranged to extend into the post-receiver passageway 121P and supported in rotative bearing engagement therein to rotate about the vertical rotation axis 13A among the right-swivel, centered, and left-swivel positions. Lockout pin 23' is arranged to extend into the pin-receiver passageway 122P and move therein to engage and disengage lockout plate 25' as suggested in FIG. 5.

Mobile cart 200 further includes means for selectively changing the compression of each of the right-side and left-side centering springs 42', 43'. Means is also included in the mobile cart 200 for selectively changing the orientation of the centered position relative to the seat-support frame 10 to a different centered position relative to the vertical rotation axis 13A to cause the swivel caster 13' to track at an angle associated with the different centered position.

First and second spring seats 142', 143' are included in a spring-stop plate 410 that is cantilevered to the caster support hub 13', and arranged to lie between the first and second spring posts 252', 253'. First spring seat 142' is formed on a first side of the spring-stop plate 410 and arranged to face toward the first spring post 252'. Second spring seat 143' is formed on an opposite side of the spring-stop plate 410 and arranged to face toward the second spring post 253'. Right-side and left-side centering springs 42', 43' are arranged to lie in generally end-to-end relation separated from one another by the spring-stop plate 410. Each of centering springs 42', 43' is a separate coiled compression spring in an illustrative embodiment.

Further building on the second embodiment of a self-centering steering damper, the ability to adjust the track or angle of the swivel in accordance with the present disclosure can be an advantage when encountering various terrains. An adjustment arranged between the spring housing cup 41' and the lockout plate 25' can be made by turning the swivel tracking adjustment knob 50' to have the swivel track at an angle other than centered to assure desired direction is achieved and eliminates veering. To adjust tracking, the swivel tracking adjustment knob 50' is turned clockwise or counterclockwise which translates the tracking adjustment spring seat 51' linearly in one direction or the opposite and the swivel is aligned either left or right by the force that is applied through the centering springs 42', 43' to the tab 410 with this adjustment.

Figure 8:
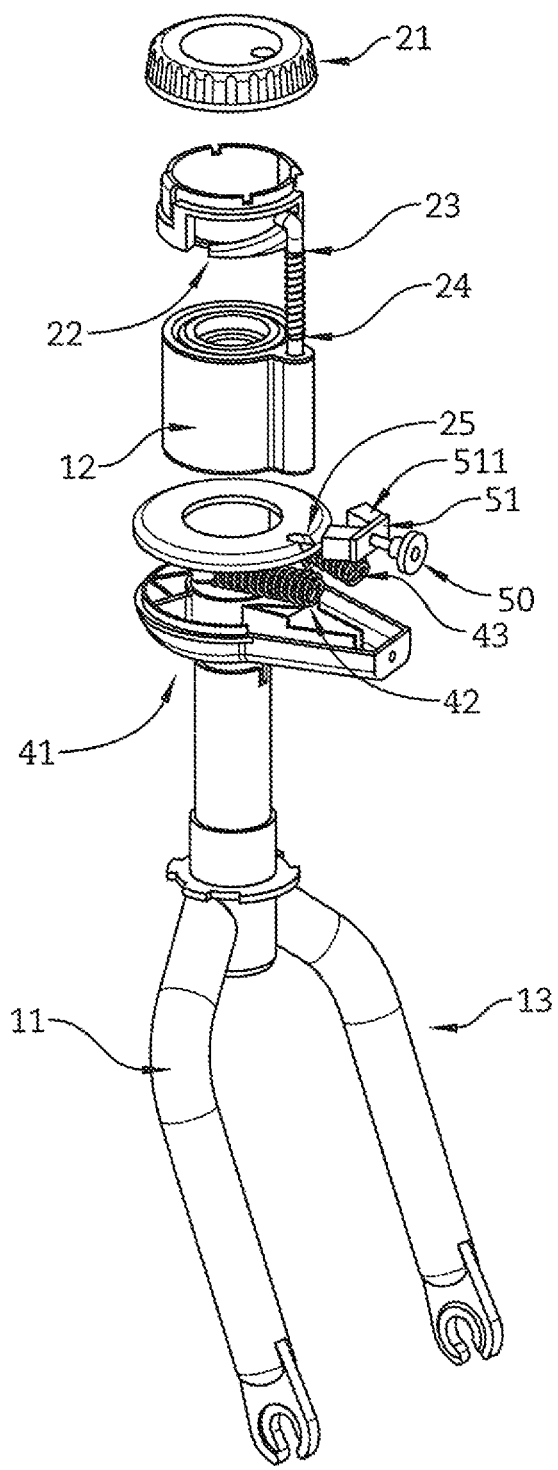
FIG. 8 is an exploded perspective assembly view of a swivel wheel unit in accordance with another embodiment of the present disclosure.
Figure 9:
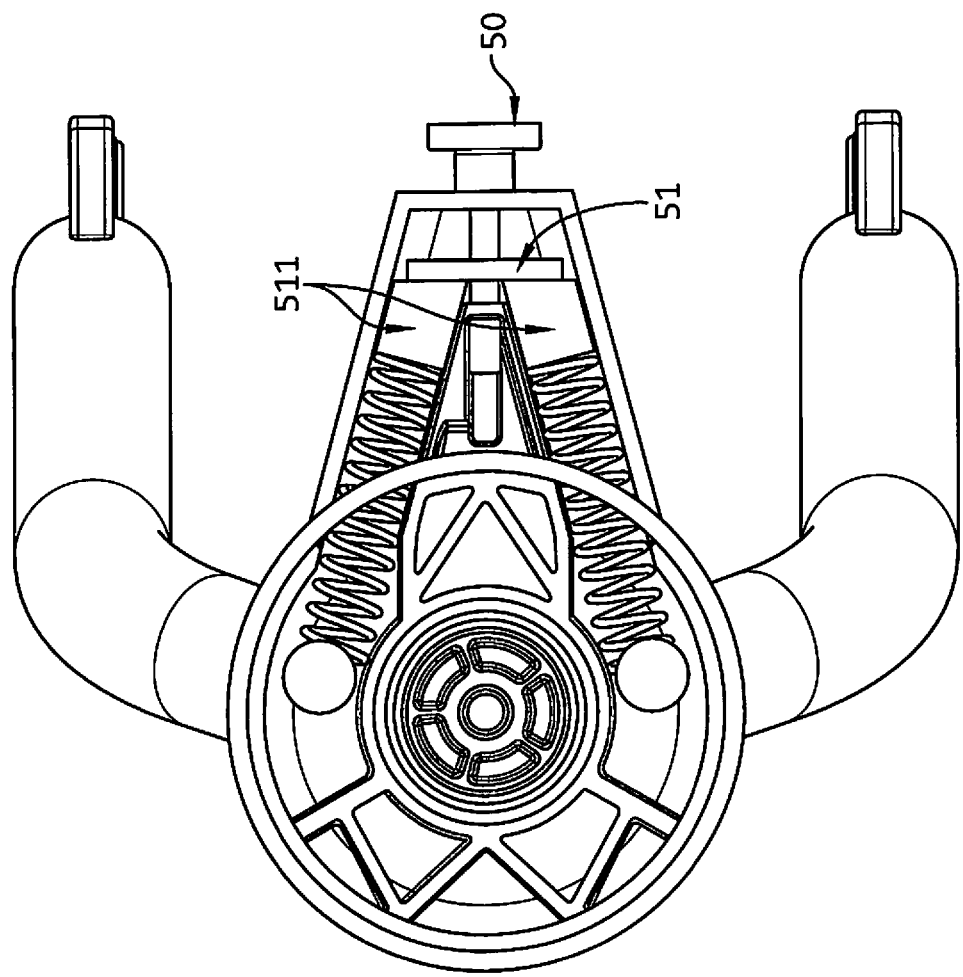
FIG. 9 is a sectional view showing a swivel caster of the swivel wheel unit of FIG. 8 in a centered position.

The first embodiment can further have an adjustment incorporated where the force bias of the steering damper is adjusted to a desired level by the user. The adjustment would allow the user to control (within a range) the force required to turn the swivel wheel left or right. This adjustment could be advantageous in managing maneuverability while compensating for occupant/parcel weight, location/orientation or terrain conditions. The adjustment arranged in the spring housing cup 41 or between the spring housing cup 41 and the lockout plate 25 is made by turning the spring bias adjustment knob 50 clockwise or counter-clockwise which will translate the adjustment spring seat 51 in or out effectively moving the spring seat branches 511 of adjustment spring seat 51 to compress or decompress the self-centering springs. The compressing or decompressing of the centering springs 42, 43 will change the force required to rotate the swivel wheel assembly left or right. FIGS. 8 and 9 show this embodiment of the invention.

In illustrative embodiments, the present disclosure, among other things is directed to a mobile cart such as a jogging stroller. An illustrative mobile cart comprises a rolling base in combination with at least one swivel wheel having self-centering mechanism, at least one swivel wheel being able to switch between a swivel mode and a jogging/running mode, at least one swivel wheel having a steering damper, at least one swivel wheel having a steering damper with adjustable bias, and/or at least one swivel wheel having a steering damper with adjustable tracking.

A mobile cart 300 in accordance with another embodiment of the present disclosure comprises a single coiled compression spring 301 rather than two coiled compression springs 42', 43'. In every other respect, mobile cart 300 is the same as mobile cart 200 described herein and shown in FIGS. 5-7B.

Figure 10:
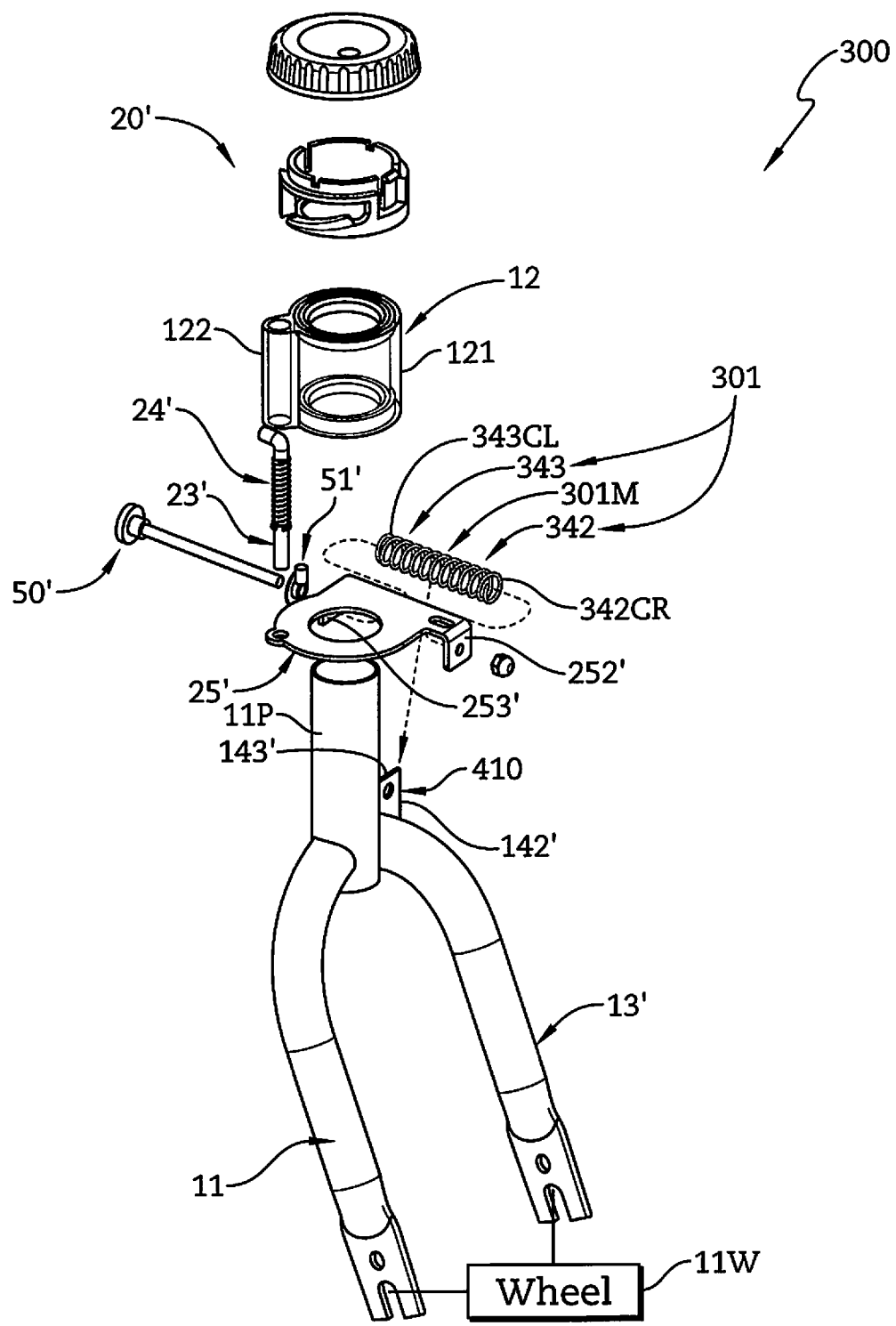
FIG. 10 is an exploded perspective assembly view of a swivel wheel unit in accordance with another embodiment of the present disclosure that is associated with a hub included in a frame of a mobile cart and showing that the swivel wheel unit includes a swivel caster including a fork and a wheel coupled to the fork, a caster controller including a single coiled compression spring, and a caster lock including a vertical spring-biased lockout pin and suggesting that the single coiled compression spring be mated to a spring-stop plate to partition the single coiled compression spring to form right-side and left-side centering springs.

Single coiled compression spring 301 comprises a right-side centering spring 342 and a left-side center spring 343 as suggested in FIG. 10. Spring 301 is made of a single piece of spring wire and is monolithic in illustrative embodiments.

First and second spring seats 142', 143' are included in a spring-stop plate 410 that is cantilevered or otherwise coupled to caster-support hub 12 as suggested in FIG. 10 (see also, for example, FIG. 6A). First and second spring seats 142', 143' are arranged as suggested in FIG. 10: (1) to lie between first and second spring posts 252', 253' and (2) to extend into and engage a middle section 301M of the single coiled compression spring 301 to partition the single coiled compression spring 301 to form right-side centering spring 342 and left-side centering spring 343. Once installed, as seen from the point of view shown in FIG. 10, a left end of right-side centering spring 342' will engage first spring seat 142' of spring-stop plate 410 and a right end of right-side centering spring 342' will engage first spring post 252'. Also, a right end of left-side centering spring 343' will engage spring seat 143' of spring-stop plate 410 and a left end of left-side centering spring 343' will engage second spring post 253'.

Right-side centering spring 342' of single coiled compression spring 301 is arranged to act against first spring post 252' and first spring seat 142' to store potential energy in response to rotation of swivel caster 13' about the vertical rotation axis 13A in the counterclockwise direction from the centered position to the right-swivel position. Left-side centering spring 343' of single coiled compression spring 301 is arranged to act against second spring post 253' and second spring seat 143' to store potential energy in response to rotation of swivel caster 13' about the vertical rotation axis 13A in the clockwise direction from the centered position to the left-swivel position.

First spring seat 142 ' is formed on a first side of spring-stop plate 410 and arranged to face toward first spring post 252' and coils 342CR included in right-side centering spring 342' as suggested in FIG. 10. Second spring seat 143' is formed on a second side of spring-stop plate 410 and arranged to face toward second spring post 253' and coils 342CL included in left-side centering spring 343 as also suggested in FIG. 10.

The invention claimed is:

1. A mobile cart comprising
a caster-support hub,
a swivel caster mounted on the caster-support hub for swiveling movement relative to the caster-support hub about a vertical rotation axis from a centered position in a counterclockwise direction to a left-swivel position or from the centered position in a clockwise direction to a right-swivel position,
a caster-controller coupled to the caster-support hub for applying a yieldable clockwise torque to the swivel caster to urge the swivel caster to rotate about the vertical rotation axis in a clockwise direction to the centered position from the left-swivel position, and, alternatively, a yieldable counterclockwise torque to the swivel caster to urge the swivel caster to rotate in a counterclockwise direction to the centered position from the right-swivel position during movement of the mobile cart so that the swivel caster is maintained generally in the centered position while the mobile cart is in motion, and
wherein the caster-controller includes a right-side centering spring, a left-side centering spring, and a swivel-rotation limiter including a first spring seat coupled to the swivel caster to rotate therewith about the vertical rotation axis and associated with the right-side centering spring, a second spring seat coupled to the swivel caster to rotate therewith about the vertical rotation axis and associated with the left-side centering spring, a lockout plate mounted on the swivel caster for rotation about the vertical rotation axis relative to the spring seats, a first spring post coupled to the lockout plate to rotate therewith, and a second spring post coupled to the lockout plate to rotate therewith, and wherein the right-side centering spring is arranged to lie in a first spring-receiver space to act against the first spring post and the first spring seat to store potential energy in response to rotation of the swivel caster about the vertical rotation axis in the counterclockwise direction from the centered position to the right-swivel position, and wherein the left-side centering spring is arranged to lie in a second spring-receiver space to act against the second spring post and the second spring seat to store potential energy in response to rotation of the swivel caster about the vertical rotation axis in the clockwise direction from the centered position to the left-swivel position,
wherein the caster is adjustable between a self-centering configuration in which the lockout plate is fixed to the caster-support hub and a free-swiveling mode in which the lockout plate is free to swivel with respect to the caster-support hub.

2. The mobile cart of claim 1, further comprising a caster-lock for retaining the swivel caster in the self-centering configuration.

3. The mobile cart of claim 2, wherein the caster-lock is coupled to the caster-support hub and configured to move relative to the caster-support hub at the option of a caregiver either to engage the lockout plate of the swivel-rotation limiter to retain the swivel caster in the self-centering configuration or to disengage the lockout plate of the swivel-rotation limiter to free the swivel caster to fully rotate about the vertical rotation axis.

4. The mobile cart of claim 2, wherein the caster-lock includes a lockout pin supported for up-and-down movement along a vertical pin-motion axis that is arranged to lie in spaced-apart parallel relation to the vertical rotation axis, a pin-biasing spring arranged normally to urge a tip of the lockout pin into a pin-receiving aperture formed in the lockout plate of the swivel-rotation retainer upon rotation of the swivel caster to the centered position to retain the swivel caster in the self-centering configuration.

5. The mobile cart of claim 4, wherein the caster-lock further includes a pin-mover for withdrawing the tip of the lockout pin from the pin-receiving aperture to overcome a biasing force generated by the pin-biasing spring to free the swivel caster to fully rotate about the vertical rotation axis.

6. The mobile cart of claim 5, wherein the pin-mover includes a swivel-lock control knob including a base mounted to rotate about the vertical rotation axis, a cam coupled to the base to rotate therewith about the vertical rotation axis, and a cam follower coupled to the lockout pin and arranged to engage the cam and move the lockout pin to disengage the pin-receiving aperture formed in the lockout plate in response to rotation of the base of the swivel-lock control knob about the vertical rotation axis relative to the caster-support hub.

7. The mobile cart of claim 6, wherein the caster-support hub includes a first sleeve formed to include a post-receiver passageway and a second sleeve coupled to the first sleeve and formed to include a pin-receiver passageway, the swivel caster includes a fork having an upright post arranged to extend into the post-receiver passageway and supported in rotative bearing engagement therein to rotate about the vertical rotation axis among the right-swivel, centered, and left-swivel positions, and the lockout pin is arranged to extend into the pin-receiver passageway and move therein to engage and disengage the lockout plate.

8. The mobile cart of claim 1, further comprising means for selectively changing the compression of each of the right-side and left-side centering springs.

9. The mobile cart of claim 1, further comprising means for selectively changing the orientation of the centered position to a different centered position relative to the vertical rotation axis to cause the swivel caster to track at an angle associated with the different centered position.

10. The mobile cart of claim 1, wherein the first and second spring seats are included in a spring housing cup that is coupled to the swivel caster to rotate therewith and formed to include a post-receiver chamber sized to receive the first and second spring posts therein, a first spring shell that is configured to define a boundary of the first spring-receiver space and extend from the first spring seat to the first spring post, and a second spring shell that is configured to define a boundary of the second spring-receiver space and extend from the second spring seat to the second spring post, and wherein the first and second spring posts are arranged to extend into the post-receiver chamber formed in the spring housing cup to engage the right-side and left-side centering springs and to move in the post-receiver chamber about the vertical rotation axis relative to the spring housing cup during rotation of the swivel caster from the centered position either to the left-swivel position or to the right-swivel position.

11. The mobile cart of claim 10, wherein the right-side and left-side centering springs are arranged to lie in generally spaced-apart side-by-side relation to one another.

12. The mobile cart of claim 10, wherein the spring housing cup further includes a first rotational stop arranged to lie in fixed spaced-apart relation to the first spring seat to locate the first spring post and the right-side centering spring therebetween and a second rotational stop arranged to lie in fixed spaced-apart relation to the second spring seat to locate the second spring post and the left-side centering spring therebetween, the first rotational stop is arranged to engage the first spring post during rotation of the swivel caster in a clockwise direction about the vertical rotation axis away from the centered position toward the right-swivel position to block further rotation of the swivel caster away from the centered position, and the second rotational stop is arranged to engage the second spring post during rotation of the swivel caster in a counterclockwise direction about the vertical rotation axis away from the centered position toward the left-swivel position to block further rotation of the swivel caster away from the centered position.

13. The mobile cart of claim 1, wherein the first and second spring seats are included in a spring-stop plate that is cantilevered to the caster-support hub and arranged to lie between the first and second spring posts, the first spring seat is formed on a first side of the spring-stop plate and arranged to face toward the first spring post, and the second spring seat is formed on an opposite side of the spring stop-plate and arranged to face toward the second spring post.

14. The mobile cart of claim 13, wherein the right-side and left-side centering springs are arranged to lie in generally end-to-end relation separated from one another by the spring-stop plate.

* * * * *